G. W. McPHERSON.
Fruit-Driers.
No. 151,416.
Patented May 26, 1874.
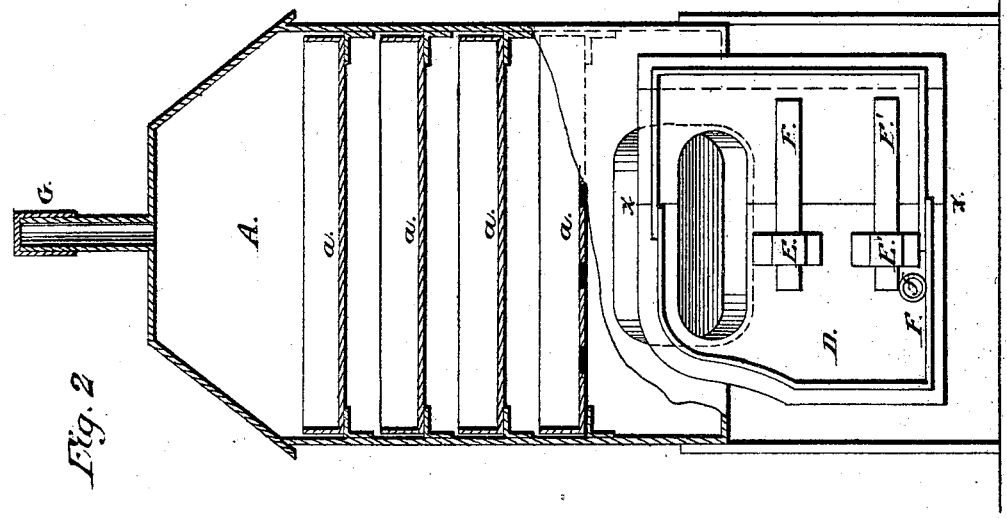
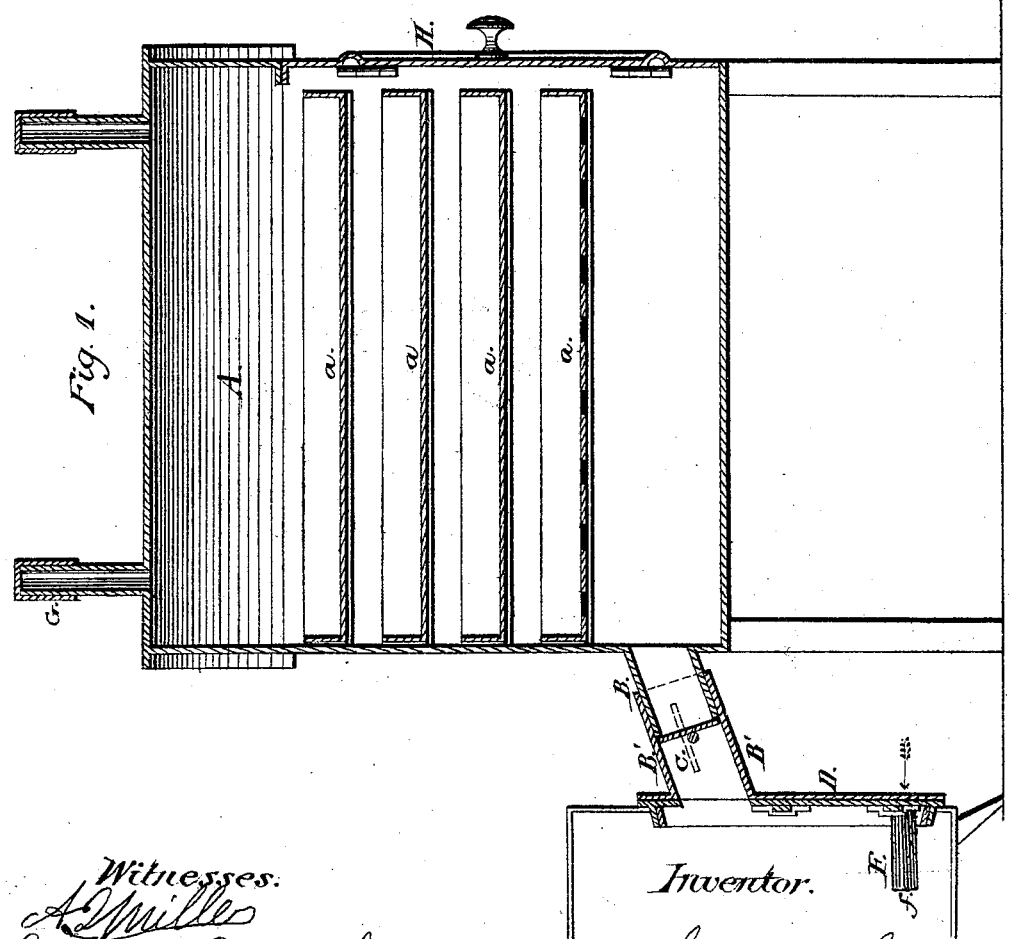
Witnesses.
Inventor.

UNITED STATES PATENT OFFICE.

JOHN W. McPHERSON, OF SHIPPENSBURG, PENNSYLVANIA.

IMPROVEMENT IN FRUIT-DRIERS.

Specification forming part of Letters Patent No. 151,416, dated May 26, 1874; application filed May 18, 1874.

*To all whom it may concern:*

Be it known that I, JOHN W. MCPHERSON, of Shippensburg, Cumberland county, Pennsylvania, have invented a Portable Fruit and Vegetable Drier, of which the following is a specification:

The object of my invention consists in the means of conveying heat from the side of stove, furnace, or range to a portable drier, for the purpose of drying fruit and vegetables, as will more fully appear in the accompanying drawing and description.

Figure 1 is the longitudinal section of a drier, showing its connection with the side of a stove. Fig. 2 is the transverse section of the same.

A A is the fruit-drier, made of tin, or any other suitable material, having trays $a\ a$, &c. B is a pipe at the lower end of the drier, made to slide easily in pipe B′, having a damper, C, to regulate the draft of hot air. D is the casing or jacket, made to fit into the doorway of a stove-oven; E E′, bars for extending the jacket D to fit different-sized doors; F, cold-air pipe; G, outlet-pipe or ventilator; H, drier door.

The jacket D is made, with the pipe B′ and cold-air pipe F, to suit the size of any ordinary stove-door.

A is any ordinary fruit or other drier, having a pipe, B, to slide into the pipe B′ like a telescope. When thus arranged, by the admission of cold air in F and the ventilator G, the hot air of the oven will ascend and pass freely under and through the drying-trays $a\ a$, &c.

It is obvious that this method of attachment may be applied to any side, end, or bottom of the drier.

I claim as my invention—

1. The drier A, in combination with the pipes B B′, damper C, and jacket D, for the purposes described.

2. The jacket D and the cold-air pipe F, in combination with the hot-air pipes B B′ and damper C, for the purpose set forth.

J. W. McPHERSON.

Witnesses:
   A. I. MILLER,
   J. W. McPHERSON, Jr.